April 5, 1927.  G. A. ANDERSON  1,623,570
TRUCK SIDE FRAME
Filed Oct. 17, 1922
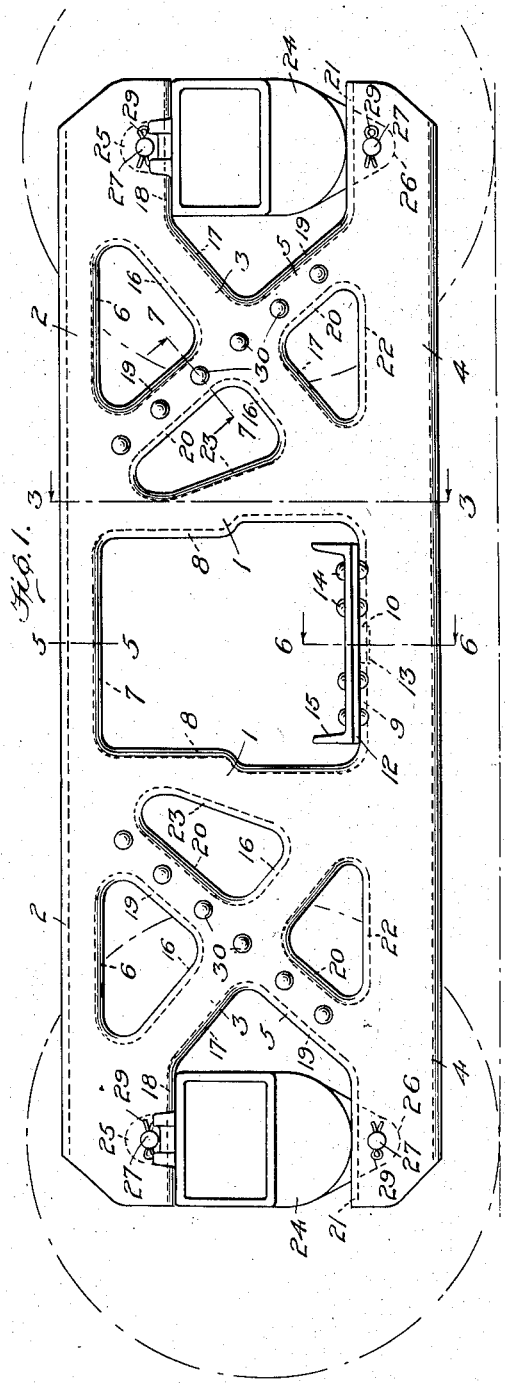

Patented Apr. 5, 1927.

1,623,570

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

TRUCK SIDE FRAME.

Application filed October 17, 1922. Serial No. 595,098.

My invention relates to side frames for car trucks and has been primarily designed to provide a construction which is both strong and stiff but comparatively light in weight and in which costs incident to manufacture and maintenance are reduced to a minimum.

The invention, generally stated, resides in forming a car truck side frame from a hollow metal member which is expanded to provide an inner wall and an outer wall arranged in spaced relation, and further cut and shaped to provide corresponding side frame parts including truck column portions, top arch bar portions, bottom arch bar portions, and pedestal tie bar portions.

Particularly stated, my invention involves the production of a car truck side frame from a tubular member of wrought metal, said member being shaped to provide corresponding side frame sections which are integrally united at both the top and bottom of the side frame, thereby providing a strong, durable and inexpensive construction requiring no rivets or welds.

Another object is to provide a metallic car truck side frame from a tubular member, the top and bottom portions of which are relatively maintained parallel throughout the length of the side frame and the intermediate portions of which are cut and shaped to form truck column portions, top arch bar portions, bottom arch bar portions, and pedestal tie bar portions, said top arch bar portions being united with the pedestal tie bar portions by connecting members integrally intersecting the bottom arch bar portions, thereby providing a construction which is greatly strengthened and reinforced at the critical points of the side frame.

The invention also has for an object the production of a car truck side frame in which the respective end portions thereof are arranged to conveniently receive the journal boxes, said journal boxes having portions adapted to be detachably connected to the spaced end portions of the side frame.

A still further object of the invention is to provide a comparatively simple construction of pivot connection for the spring plank in which the pivot stud is cast integral with the spring plank seat casting, and the opening adapted to receive said stud is formed in the inwardly extending stiffening flanges adjacent the lower edge of the bolster opening.

The invention further consists in the method of manufacturing a car truck side frame by forming the same from a hollow tubular member which is expanded, cut and shaped to provide corresponding side frame portions, said side frame portions being integrally united at both the top and bottom of the side frame and being provided with inwardly extending stiffening flanges relatively spaced from each other with respect to an axis of symmetry passing between the side frame portions.

The invention further consists in the particular arrangement and combination of the parts and details of construction, all as will hereinafter appear.

In the drawings illustrating the invention, the scope whereof is pointed out in the claims:

Figure 1 is a view in side elevation of a car truck side frame embodying the invention and disclosing in combination therewith an improved construction of journal box, the wheels of the car truck being shown diagrammatically in dotted lines.

Figure 2 is an end view of the side frame and journal box connected thereto.

Figure 3 is a vertical transverse sectional view on the line 3—3 of Figure 1, viewed in the direction of the arrows.

Figure 4 is a detail view of the pivot stud opening provided in the inwardly extending flanges bordering the lower edge of the bolster opening.

Figure 5 is a detail vertical transverse sectional view on the line 5—5 of Figure 1.

Figure 6 is a detail vertical transverse sectional view on the line 6—6 of Figure 1.

Figure 7 is a detail cross sectional view on the line 7—7 of Figure 1.

Referring to the drawings in which corresponding reference characters designate similar parts in the several views, my improved side frame includes an outer wall and an inner wall formed from a tubular member suitably pressed to space the respective side walls, as shown, and integrally uniting the same along parallel lines at the top and bottom of the side frame. The top and bottom portions of the side frame are preferably slightly crowned, as shown. Each side wall is provided with truck column portions 1, top arch bar or compression portions 2, bottom arch bar or tension portions 3, and pedestal tie bar portions 4. Each side wall is also provided with connecting or strut portions 5 which unite the top arch bar portions with the pedestal tie bar portions, said connecting or strut portions 5 being adapted to integrally intersect the bottom arch bar portions 3, as clearly shown in Figure 1.

The top of the side frame is preferably formed on a straight line, the lower edges of the top arch bar portions being provided with inwardly extending flanges 6. Inwardly projecting stiffening flanges 7 are also provided on the lower edges of the top arch bar portions between the truck column portions, said flanges being relatively wide and closely spaced, as shown in Figure 5. The stiffening flanges 7 are continued downwardly and merge into inwardly extending stiffening flanges 8 provided on the truck column portions adjacent the bolster opening. The flanges 8 are preferably continued across the lower edge of the bolster opening and provide the spring plank seat portion of the side frame. The numeral 9 indicates the flanges providing the spring plank seat portion, said flanges being provided with recessed portions arranged to form a pivot opening 10 intermediate the truck columns. The edges of the flanges 9 adjacent the opening 10 are preferably welded, as indicated at 11, in Figure 4, said welds serving to firmly unite the flanges in which the pivot opening is provided.

The spring plank seat casting 12 is provided with a pivot stud 13 integrally formed therewith, said pivot stud being adapted to project into the opening 10, as shown in Figure 6. Rivets 14 connect the spring plank 15 to the spring plank seat casting 12. The foregoing construction provides an altogether inexpensive and durable pivot or swivel connection for the spring plank.

The bottom arch bar portions 3 are each provided with inwardly extending stiffening flanges 16 along the upper edges thereof, and similar flanges 17 arranged along the lower edges of said bottom arch bar portions. The flanges 17 are preferably prolonged across the top of the journal boxes, as indicated at 18, said flanges being suitably spaced to provide for the reception of portions of the journal boxes. The stiffening flanges 16 and 17 of the bottom arch bar portions are adapted to be merged intermediate their ends into inwardly extending stiffening flanges 19 and 20, respectively. The flanges 19 and 20 are provided on the connecting or strut portions 5 of the side walls, the flanges 19 being provided along the upper edges of the strut portions, and the flanges 20 being arranged along the lower edges of said strut portions. The inwardly extending stiffening flanges of both the arch bar portions and the strut portions are adapted to merge into each other at the intersection of the strut portions with the bottom arch bar portions. The upper flanges 19 of the strut portions are preferably prolonged beneath the journal boxes, as indicated by the numeral 21, said flanges being merged into the pedestal tie bar portions and suitably spaced to receive portions of the journal box.

The pedestal tie bar portions 4 are provided along their upper edges with inwardly extending stiffening flanges 22, said flanges forming continuations of the bottom arch bar flanges 17 and strut flanges 20, said flanges 17, 20 and 22 forming a continuous border for the triangular opening formed thereby. The triangular opening at the top of the side frame is similarly bordered by the continuous flanges 6, 16 and 19. The rear edges of the truck column portions 1 are provided with inwardly extending stiffening flanges 23, said flanges being angularly disposed with relation to the truck column flanges 8 and adapted to merge with the stiffening flanges 16 of the bottom arch bar portions and the stiffening flanges provided on the connecting or strut portions 5. The flanges 16, 20 and 23 border and surround the substantially triangular opening formed by the respective truck column portions, bottom arch bar portions and strut portions. The angular disposition of the flanges 23 permits the lower portions of the truck columns to be relatively wide, the cross sectional area of the metal at the junctions of the truck column portions, bottom arch bar portions, and pedestal tie bar portions being greatly increased to provide maximum strength values at these critical points or junctions of the side frame. In addition, the cross sectional areas of the pedestal tie bar portions are also materially increased thereby providing a strong longitudinal portion of the side frame extending beneath the bolster opening and supporting the journal boxes. The interpositioning of the strut portions 5 between the top arch bar portions at the junctions of the truck column portions therewith and the pedestal tie bar portions adjacent the journal boxes, also serve to greatly strengthen the side frame and reduce possibilities of failures thereof at or near these points to a minimum.

The respective end portions of the side frame are extended in parallel relation, journal boxes 24 being detachably connected between the parallel end portions. Each journal box is provided with an upper projection 25 and a lower projection 26, the former of said projections being adapted to extend between the prolonged and spaced flanges indicated by the numeral 18 at the top of the journal box and the latter of said projections being arranged to fit between the prolonged and spaced flanges indicated by the numeral 21 extending beneath the journal box. Each projection extending from the journal box is provided with an opening, said opening being suitably alined transversely of the frame with openings in the side walls thereof, a pin 27 being adapted to pass through said alined openings and securely attach the journal box to the side frame. The pin is preferably provided with a head 28 and the opposite end of said pin is designed to receive the cotter 29. The projections 25 and 26 are arranged intermediate the front and rear portions of the journal boxes, said projections being of a width which can be easily inserted between the inwardly extending stiffening flanges projecting from the side walls above and below the journal boxes. The foregoing construction permits the journal boxes to be easily and rapidly attached or removed from the side frame.

The side walls may be tied and spaced at points throughout the side frame, my present construction providing for the insertion of the tie means throughout the length of the connecting or strut portions 5. Rivets 30 serve to firmly unite the side wall portions, and sleeves 31 interposed between the side walls serve to maintain the same in proper spaced relation. A plurality of tie and spacing means may be provided, as shown, said means adding to the rigidity of the strut connection and otherwise materially resisting the strains to which adjacent portions of the side frames are subjected under service conditions.

The method of manufacturing my improved car truck side frame consists in shaping a hollow member, preferably of tubular formation, and providing by said shaping a plurality of corresponding side frame portions. My improved method also involves the expanding, cutting and bending of the tubular member to provide corresponding side frame portions, all of which are integrally united.

It will be noted that a truck frame embodying my invention not only has the merit of being constructed of light and reliable material but its parts are so formed and combined that the points subjected to the great strains in service are rendered exceedingly strong. It will also be perceived that the construction makes it possible to avoid the use of rivets which would be subjected to shearing strains.

I claim:

1. A car truck side frame involving spaced side walls integrally connected along the upper and lower marginal edges thereof.

2. A car truck side frame involving an integral hollow metal member shaped to form an inner wall and an outer wall arranged in spaced relation, each of said walls having a plurality of truck column portions, top arch bar portions, bottom arch bar portions, and pedestal tie bar portions.

3. A car truck side frame formed from a unitary hollow metal member shaped to form inner and outer side walls each of which is provided with a bolster opening, and inwardly extending stiffening flanges adapted to border said bolster opening.

4. A car truck side frame involving a hollow metal member expanded to provide parallel top and bottom portions of the side frame and shaped to provide spaced inner and outer side walls having corresponding side frame portions.

5. A car truck side frame involving a hollow metal member expanded to provide truck column portions, top arch bar portions, bottom arch bar portions, and pedestal tie bar portions.

6. A car truck side frame involving a hollow metal member shaped to provide spaced inner and outer side walls, each of said walls being provided with truck column portions, top arch bar portions, bottom arch bar portions, pedestal tie bar portions, and means including a member connecting said top arch bar portions and pedestal tie bar portions, said member being formed integral with the side walls and designed to intersect the bottom arch bar portions.

7. A car truck side frame involving a hollow metal member shaped to provide spaced inner and outer side walls, each of said walls being provided with truck column portions, top arch bar portions, bottom arch bar portions, and pedestal tie bar portions; and connecting strut portions adapted to integrally unite the top arch bar portions, bottom arch bar portions, and pedestal tie bar portions.

8. A car truck side frame involving a hollow metal member shaped to provide spaced inner and outer side walls, each of said walls being provided with truck column portions, top arch bar portions, bottom arch bar portions, and pedestal tie bar portions; and reinforcing strut portions adapted to unite the top arch bar portions with the pedestal tie bar portions.

9. A car truck side frame involving a hollow metal member shaped to provide spaced inner and outer side walls, each of said walls being provided with truck column portions, top arch bar portions, bottom arch bar portions, and pedestal tie bar portions; and reinforcing strut portions adapted to unite the top arch bar portions, bottom arch bar portions, and pedestal tie bar portions.

10. A car truck side frame involving a hollow metal member shaped to provide spaced inner and outer side walls, each of said walls being provided with truck column portions, top arch bar portions, bottom arch bar portions, pedestal tie bar portions, and reinforcing strut portions; and inwardly extending stiffening flanges provided on all of said side wall portions.

11. A car truck side frame involving a hollow metal member shaped to provide spaced inner and outer side walls, each of said walls being provided with truck column portions, top arch bar portions, bottom arch bar portions, pedestal tie bar portions, and reinforcing strut portions; said reinforcing strut portions being provided with inwardly extending stiffening flanges adapted to be merged into the pedestal tie bar portions and prolonged to extend beneath the journal boxes.

12. A car truck side frame involving a hollow metal member shaped to provide spaced inner and outer side walls, each of said walls being provided with truck column portions, top arch bar portions, bottom arch bar portions, pedestal tie bar portions, and reinforcing strut portions; and means including a plurality of tie members uniting the side walls throughout the length of said reinforcing strut portions.

13. A car truck side frame involving a hollow metal member shaped to provide spaced inner and outer side walls, each of said walls being provided with truck column portions, top arch bar portions, bottom arch bar portions, pedestal tie bar portions, and reinforcing strut portions; and tying and spacing means uniting the side walls, said tying and spacing means being arranged throughout the length of said reinforcing strut portions.

14. A car truck side frame involving a hollow tubular member shaped to provide inner and outer side walls arranged in spaced relation, each of said side walls having a plurality of truck column portions, a plurality of top arch bar portions, a plurality of bottom arch bar portions, a plurality of pedestal tie bar portions, and a plurality of reinforcing strut portions, said reinforcing strut portions being formed integrally with the bottom arch bar portions and having their respective ends united with the top arch bar portions at the top of the truck column portions and the pedestal tie bar portions adjacent the journal boxes.

15. A car truck side frame involving a hollow tubular member shaped to provide inner and outer side walls arranged in spaced relation, each of said side walls having a plurality of truck column portions, a plurality of top arch bar portions, a plurality of bottom arch bar portions, a plurality of pedestal tie bar portions, and a plurality of reinforcing strut portions, said reinforcing strut portions being integrally united with the top arch bar portions at the top of the truck column portions and also integrally united with the pedestal tie bar portions adjacent the journal boxes.

16. A car truck side frame involving a hollow tubular member shaped to provide inner and outer side walls arranged in spaced relation, each of said side walls having a plurality of truck column portions, a plurality of top arch bar portions, a plurality of bottom arch bar portions, a plurality of pedestal tie bar portions, and a plurality of reinforcing strut portions; said reinforcing strut portions being adapted to integrally intersect the bottom arch bar portions and having their respective end portions integrally united with the top arch bar portions at the top of the truck column portions, and with the pedestal tie bar portions adjacent the journal boxes.

17. In combination, a car truck side frame having inner and outer side walls having end portions arranged in spaced relation, journal boxes having portions adapted to extend between the side walls at the spaced ends of the side frame, and means detachably connecting said journal boxes to the side frame.

18. In combination, a car truck side frame having laterally opened spaced end portions, journal boxes provided with projections on the upper and lower faces thereof adapted to be connected to said spaced end portions, and pins adapted to pass through the end portions and said projections for connecting the journal boxes to the side frame.

19. In combination, a car truck side frame shaped to provide a plurality of bottom arch bar portions and pedestal tie bar portions, inwardly extending stiffening flanges provided on said portions, said flanges being adapted to be prolonged above and below the top and bottom of the journal boxes and arranged in spaced relation, and journal boxes having projections adapted to extend between the said prolonged flanges.

20. A pressed metal car truck side frame shaped to provide inner and outer side walls having a bolster opening, inwardly extending flanges adjacent the lower edge of said bolster opening, said flanges being provided with cut away portions adapted to form an opening for the reception of the pivot stud of the spring plank.

21. A pressed metal car truck side frame shaped to provide inner and outer side walls having a bolster opening, inwardly extending stiffening flanges provided adjacent the lower edge of said bolster opening, said flanges being cut away and having opposite edge portions united to form a spring plank pivot stud opening.

22. The method of manufacturing car truck side frames which consists in forming the same from a hollow tubular member, expanding portions of said member to provide parallel upper and lower edges, and cutting and shaping other parts to provide corresponding side frame portions.

23. The method of manufacturing car truck side frames which consists in forming the same from a hollow tubular member by expanding portions of said member to form spaced side walls, and bending portions of said member to form stiffening flanges for said side walls.

24. The method of manufacturing car truck side frames which consists in forming the same from a hollow member by expanding portions of said member to provide spaced side walls, and cutting and shaping other parts of said member to provide corresponding side frame portions.

25. The method of manufacturing car truck side frames which consists in forming the same from a hollow integral member open at both ends by expanding portions thereof to form side walls, cutting the said member to provide top arch bar portions, bottom arch bar portions, pedestal tie bar portions, and truck column portions; and bending stiffening flanges from the side wall portions adjacent said enumerated side frame portions.

26. A truck side frame comprising a hollow metal member shaped to form truck column portions, compression portions, tension portions, tie bar portions, and members connecting said top arch bar portions adjacent the tops of the truck column portions with the tie bar portions adjacent the ends thereof.

27. A car truck side frame comprising a hollow metal member shaped to form truck column portions, compression portions, tension portions, and diagonal bracing portions extending from near the tops of the truck column portions downwardly and outwardly and connected with the tension portions.

28. A car truck side frame comprising a sheet metal member elongated in cross section to form side walls, each of which is shaped to provide truck column portions, top arch bar portions, bottom arch bar portions, tie bar portions, and portions extending diagonally from points adjacent the junctions of the top arch bar portions and truck column portions outwardly and downwardly and uniting with the tie bar portions.

In testimony whereof I affix my signature.

GUSTAF A. ANDERSON.